US011988996B2

(12) United States Patent
Sawai

(10) Patent No.: US 11,988,996 B2
(45) Date of Patent: May 21, 2024

(54) TIMEPIECE COMPONENT AND TIMEPIECE

(71) Applicant: Seiko Epson Corporation, Tokyo (JP)

(72) Inventor: Takenori Sawai, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 57 days.

(21) Appl. No.: 17/836,010

(22) Filed: Jun. 9, 2022

(65) Prior Publication Data

US 2022/0397865 A1 Dec. 15, 2022

(30) Foreign Application Priority Data

Jun. 10, 2021 (JP) ................................ 2021-097137

(51) Int. Cl.
*G04B 37/22* (2006.01)

(52) U.S. Cl.
CPC .................................. *G04B 37/223* (2013.01)

(58) Field of Classification Search
CPC .............................. G04B 37/223; G04B 37/22
See application file for complete search history.

(56) References Cited

U.S. PATENT DOCUMENTS 4,745,035 A * 5/1988 Saurer .................. C23C 28/023 428/673
8,343,584 B2 * 1/2013 Kawakami ............. B05D 3/107 427/398.1
9,066,564 B2 * 6/2015 Tsukamoto ............ G04B 37/00
9,448,535 B2 * 9/2016 Takazaki ............. C23C 14/0635
9,471,040 B2 * 10/2016 Takazaki ............... C23C 28/042
2003/0118772 A1 * 6/2003 Hosoda .................. G11B 7/252
2007/0217293 A1 * 9/2007 Takasawa ............ C21D 8/0257 428/682
2009/0233123 A1 * 9/2009 Kawakami .......... C23C 14/3414 204/192.15
2016/0053371 A1 2/2016 Tanaka
2018/0217559 A1 8/2018 Furusato
2019/0379000 A1 * 12/2019 Aita ................ H01L 31/022425
2021/0222285 A1 7/2021 Takazaki
2022/0154346 A1 * 5/2022 Manasterski ...... G04B 45/0076

FOREIGN PATENT DOCUMENTS

CN 108375893 A 8/2018
CN 109072405 A 12/2018
JP 2018-053365 A 4/2018

OTHER PUBLICATIONS

Nie et al., "Structural and electrical properties of tantalum nitride thin films fabricated by using reactive radio-frequency magnetron sputtering", 2001, Applied Physics 73, 229-236 (Year: 2001).*
Excerpt from Wikipedia article "Vickers hardness" (Year: 2023).*

* cited by examiner

*Primary Examiner* — Edwin A. Leon
*Assistant Examiner* — Sean R Brannon
(74) *Attorney, Agent, or Firm* — Harness, Dickey & Pierce, P.L.C.

(57) ABSTRACT

A timepiece component includes a base member, a first layer provided at the base member, and a second layer provided at the first layer. The second layer has lower hardness than the first layer.

4 Claims, 5 Drawing Sheets

| COMBINATION No. | BASE MEMBER | FIRST LAYER | SECOND LAYER |
|---|---|---|---|
| 1 | TITANIUM | TITANIUM NITRIDE (TiN) | TITANIUM OXIDE ($TiO_2$) |
| 2 | TITANIUM | TITANIUM CARBONITRIDE (TiCN) | TITANIUM OXIDE ($TiO_2$) |
| 3 | TANTALUM | TANTALUM NITRIDE (TaN) | TANTALUM OXIDE ($Ta_2O_5$) |
| 4 | ZIRCONIA | ZIRCONIUM NITRIDE (ZrN) | ZIRCONIUM OXIDE ($ZrO_2$) |

FIG. 7

| COMBINATION No. | BASE MEMBER | FIRST LAYER | SECOND LAYER |
|---|---|---|---|
| 11 | TITANIUM | TITANIUM OXIDE ($TiO_2$) | TITANIUM |
| 12 | TITANIUM | TITANIUM NITRIDE (TiN) | TITANIUM |
| 13 | TITANIUM | TITANIUM CARBONITRIDE (TiCN) | TITANIUM |
| 14 | ZIRCONIA | ZIRCONIUM OXIDE ($ZrO_2$) | ZIRCONIA |
| 15 | ZIRCONIA | ZIRCONIUM NITRIDE (ZrN) | ZIRCONIA |
| 16 | TANTALUM | TANTALUM OXIDE ($Ta_2O_5$) | TANTALUM |
| 17 | TANTALUM | TANTALUM NITRIDE (TaN) | TANTALUM |

TIMEPIECE COMPONENT AND TIMEPIECE

The present application is based on, and claims priority from JP Application Serial Number 2021-097137, filed Jun. 10, 2021, the disclosure of which is hereby incorporated by reference herein in its entirety.

BACKGROUND

1. Technical Field

The present disclosure relates to a timepiece component and a timepiece including the timepiece component.

2. Related Art

In the related art, an exterior component of a wristwatch was required to have good decorativeness, resistance to scratches during use, and the like. For example, JP-A-2018-53365 discloses a decorative article in which a black hard coating film is formed on a surface of base member. According to this patent literature, deterioration in appearance quality such as scratches during use can be reduced without impairing decorativeness by providing the coating film. An example of the decorative article is a timepiece.

On the other hand, there were needs for preferring an appearance having a feeling of use in which a color tone or a texture changes during use, an antique appearance, or the like.

However, according to the technique of JP-A-2018-53365, it was difficult to enjoy the change in appearance during use since the decorative article is resistant to scratches and is maintained in a new condition. In other words, there was a demand for a timepiece component that changes into an appearance having an appropriate feeling of use or an antique appearance during use.

SUMMARY

A timepiece component according to the present disclosure includes a base member, a first layer provided at the base member, and a second layer provided at the first layer. The second layer has lower hardness than the first layer.

A timepiece according to the present disclosure includes the above timepiece component.

BRIEF DESCRIPTION OF THE DRAWINGS

FIG. 7 is a table showing combinations of different configurations.

DESCRIPTION OF EXEMPLARY EMBODIMENTS

First Embodiment

Outline of Timepiece

Figure 1:
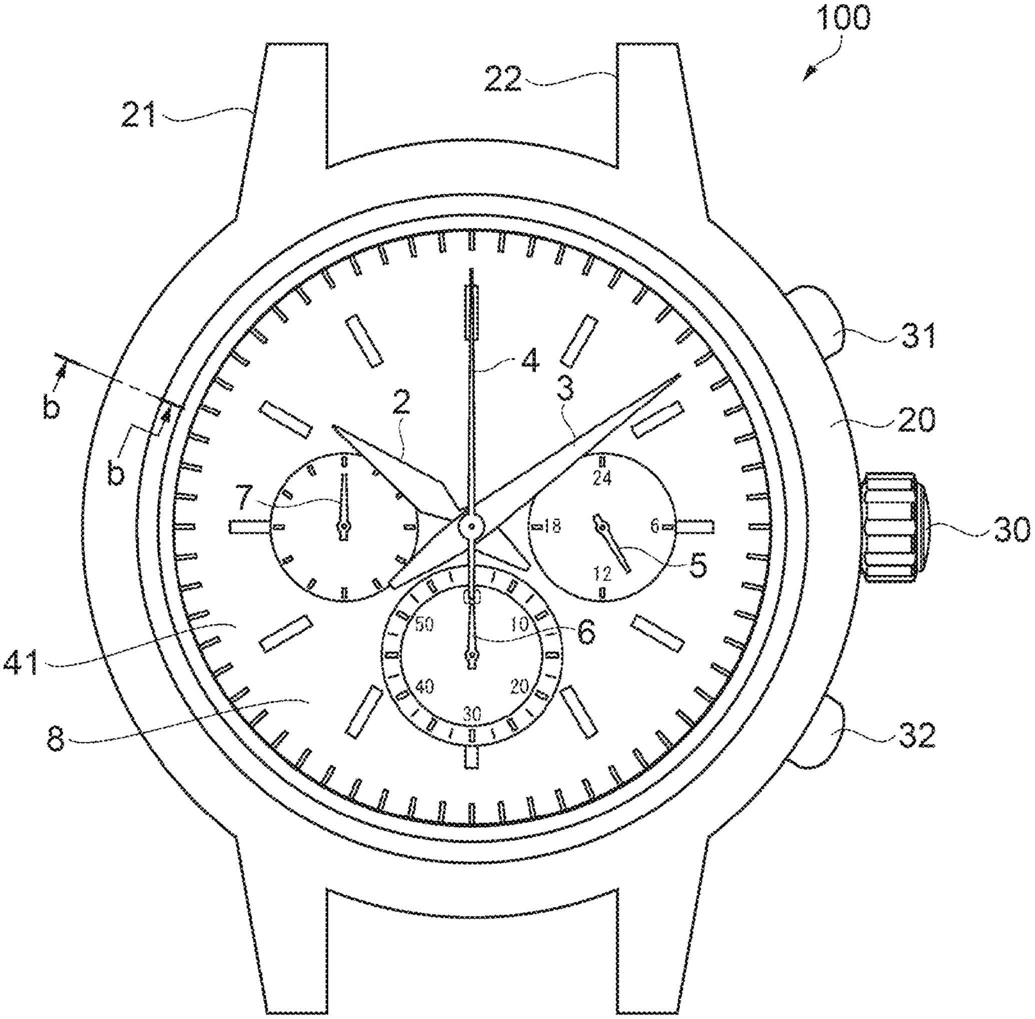
FIG. 1 is a plan view of a timepiece according to a first embodiment.

FIG. 1 is a plan view of a timepiece according to the present embodiment when viewed from front.

A timepiece 100 of the present embodiment is an analog wristwatch having a stopwatch function.

The timepiece 100 includes a timepiece body 20, a dial 8, a crown 30, a button 31, a button 32, a windshield glass 41, and the like. A back side of the timepiece body 20 is provided with a back cover that is not shown in the drawing.

The timepiece body 20 as a timepiece component is a case, and is made of titanium in a preferred example. A surface treatment described later is applied to the timepiece body 20, and thus the timepiece body changes into an appearance having an appropriate feeling of use during use of the timepiece 100. Details will be described later. It should be noted that a material is not limited to titanium, and may be a hard material having a good texture, and may be, for example, metal such as stainless steel or ceramics.

The dial 8 is provided with an hour hand 2, a minute hand 3, a chronograph second hand 4, a 24-hour hand 5, a chronograph minute hand 6, a second hand 7, and the like.

The hour hand 2, the minute hand 3, and the chronograph second hand 4 are disposed at a center of the dial 8 having a circular shape. The 24-hour hand 5 is provided at a center of a subdial disposed in a 3 o'clock direction of the dial 8. The chronograph minute hand 6 is provided at a center of a subdial disposed in a 6 o'clock direction of the dial 8. The second hand 7 is disposed at a center of a subdial disposed in a 9 o'clock direction of the dial 8 and indicates a second.

The crown 30 is a winding crown provided on a 3 o'clock side of the timepiece body 20, and is made of the same material as that of the timepiece body 20. In a preferred example, the crown 30 is made of titanium.

The button 31 is a press button for operations and is provided in a 2 o'clock direction of the timepiece body 20. When pressed once, the button 31 starts a chronograph operation, and when pressed once again, the button 31 stops the chronograph operation. When the chronograph operation starts, the chronograph second hand 4, the chronograph minute hand 6, and the 24-hour hand 5 respectively indicate an elapsed time. A material of the button 31 is the same as that of the timepiece body 20. In a preferred example, the button 31 is made of titanium.

The button 32 is a press button for operations and is provided in a 4 o'clock direction of the timepiece body 20. The button 32 has a function of chronograph resetting. When the button 32 is pressed after chronograph timekeeping, the chronograph second hand 4, the chronograph minute hand 6, and the 24-hour hand 5 are reset and returned to a 12 o'clock position. A material of the button 32 is the same as that of the button 31.

The windshield glass 41 is made of transparent glass.

Surface Treatment Method for Timepiece Body

Figure 2:
FIG. 2 is a cross-sectional view of a timepiece body.
Figure 3:
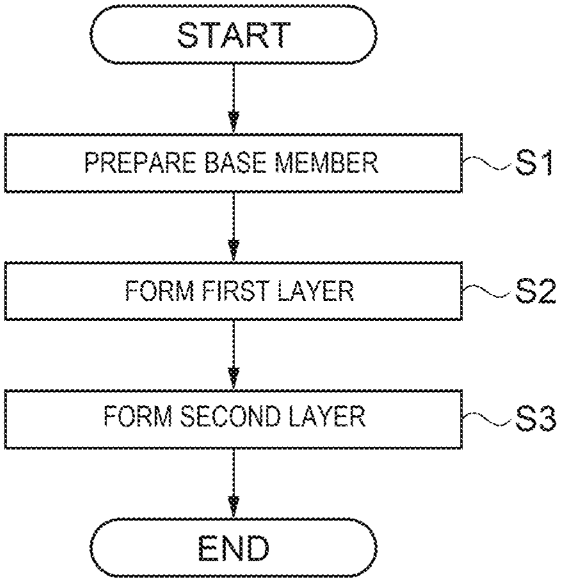
FIG. 3 is a flowchart showing a flow of a surface treatment.

FIG. 2 is a cross-sectional view taken along a line b-b of FIG. 1. FIG. 3 is a flowchart showing a flow of the surface treatment method for the timepiece body.

Here, a cross-sectional configuration of the timepiece body 20 and the surface treatment method will be described with reference to FIGS. 2 and 3.

As shown in FIG. 2, the timepiece body 20 has a structure in which two layers including a first layer 11 and a second layer 12 are stacked on a surface of a base member 10. In other words, the timepiece body 20 includes the base member 10, the first layer 11 provided at the base member 10, and the second layer 12 provided at the first layer 11.

Here, the second layer 12 is formed of a film having lower hardness than the first layer 11. In a preferred example, the first layer 11 made of a titanium nitride (TiN) film is formed at the base member 10 made of titanium, and the second layer 12 made of a titanium oxide ($TiO_2$) film is formed at the first layer 11.

Next, a specific surface treatment method will be described with reference to FIG. 3.

In step S1, the base member 10 is prepared. In a preferred example, the timepiece body 20 is prepared by processing titanium as a material into a shape of the timepiece body.

In step S2, the first layer 11 is formed on the surface of the base member 10. Specifically, the base member 10 is placed in a reaction chamber, and nitrogen gas in a heated state is supplied to deposit a titanium nitride film on the surface of the base member 10. The present disclosure is not limited to a thermal chemical vapor deposition (CVD) method, and may use a method as long as a titanium nitride film can be formed, for example, a plasma CVD method.

In step S3, the second layer 12 is formed on the first layer 11. Specifically, the base member 10 provided with the first layer 11 is immersed in a solution. In a preferred example, a hydrogen peroxide solution ($H_2O_2$) is used as the solution. A solution temperature is about 40° C., and an immersion time is 30 minutes or more.

Here, the first layer 11 made of the titanium nitride film reacts with the hydrogen peroxide solution as the solution, and nitrogen is removed from the titanium nitride film. Details are shown in a reaction formula (1) as follows.

$$TiN+H_2O_2=TiO+NOx+H_2O \qquad \text{Formula (1)}$$

As a result, the second layer 12 made of a titanium oxide film is formed on the first layer 11.

Then, the timepiece body 20, which includes the first layer 11 made of a titanium nitride film and the second layer 12 made of a titanium oxide film, is formed on the surface of the base member 10 as shown in FIG. 2 by the above steps.

Preferred Condition of Oxidation Treatment

Figure 4:
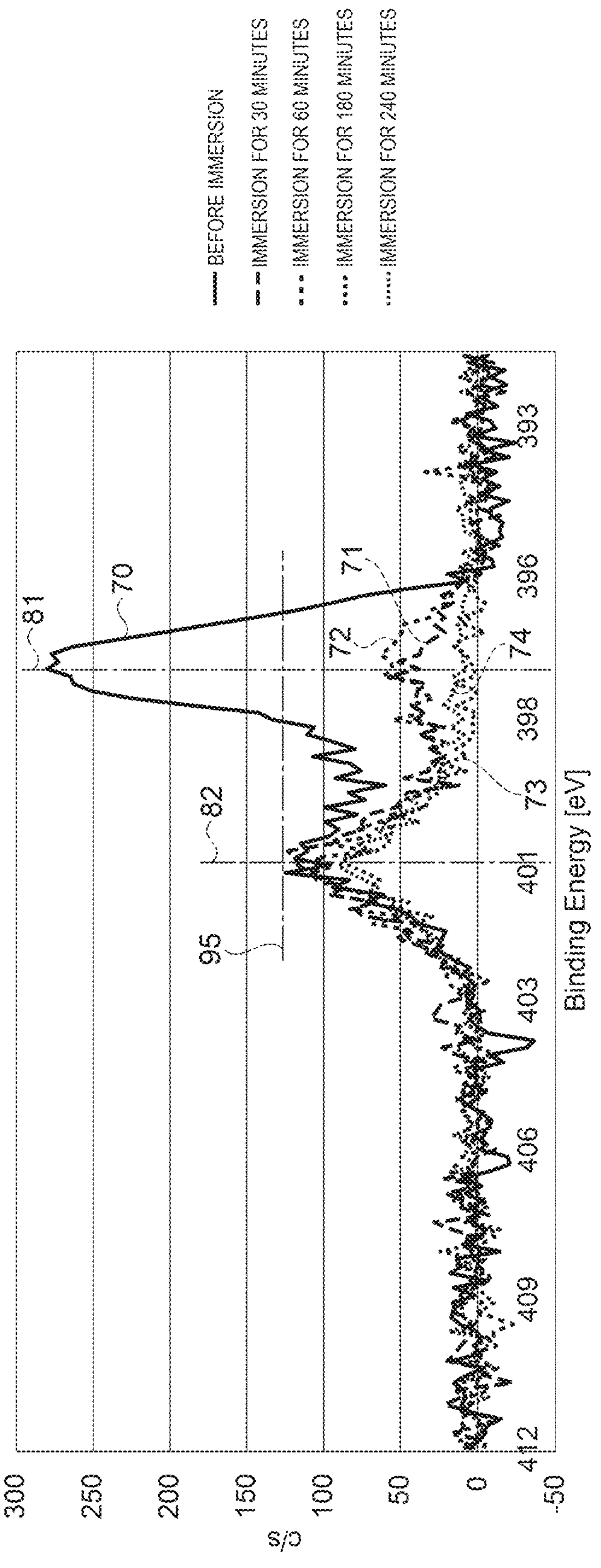
FIG. 4 is a photoelectron spectrogram showing an element composition and a chemical bonding state on a surface of a second layer.

FIG. 4 is a photoelectron spectrogram showing an element composition and a chemical bonding state on a surface of the second layer. The photoelectron spectrogram is measured by using a scanning X-ray photoelectron spectrometer. In FIG. 4, a horizontal axis represents a binding energy value (eV) of an electron to be measured with respect to an atomic nucleus, and a vertical axis represents an emitted photoelectron intensity (c/s). Measurement conditions of the scanning X-ray photoelectron spectrometer are as follows.

Model number of the photoelectron spectrometer: PHI X-tool (manufactured by ULVAC-PHI Inc.)

X-ray source: (Mgkα) 15.0 kV 26.7 mA (400 W)

Detection depth: 10 nm (detector detection angle: 45°)

In addition, as a pretreatment, an object to be measured (timepiece body) was immersed in an acetone solvent, washed by an ultrasonic cleaner at 38 kHz for 5 minutes, and then measured by the photoelectron spectrometer.

In FIG. 4, a graph 70 shows a measurement result of the first layer 11 including a titanium nitride film before immersion in the solution in step S3. As shown in the graph 70, in an initial titanium nitride film, a first spectral peak of about 125 c/s is observed in the vicinity of 401 eV, and a second spectral peak of about 275 c/s is observed in the vicinity of 397 eV.

Here, the first spectral peak is a peak value of N—O, and the second spectral peak is a peak value of N1s. In FIG. 4, a binding energy value representing N—O is indicated by a line segment 82, and a binding energy value representing N1s is indicated by a line segment 81. The peak value of N—O is indicated by a line segment 95.

A graph 71 shows a measurement result of the second layer 12 in the titanium oxide film after immersion for 30 minutes in a solution immersion step in step S3. As shown in the graph 71, it can be seen that a first spectral peak around 401 eV substantially coincides with that of the graph 70, and a second spectral peak around 397 eV greatly decreases from the second spectral peak value of the graph 70. Specifically, a peak value of N1s in the graph 71 is lower than the line segment 95 indicating the peak value of N—O, and is equal to or less than half of the line segment 95. This indicates that oxidation of the second layer 12 proceeds to form an oxide film. In other words, in X-ray photoelectron spectroscopy, a peak value of an N1s spectrum of the second layer 12 is equal to or less than a peak value of an N—O spectrum.

A graph 72 shows a measurement result of the second layer 12 in the titanium oxide film when an immersion time in the solution immersion step of step S3 is set to 60 minutes. Similarly, a graph 73 shows a measurement result when the immersion time is 180 minutes, and a graph 74 shows a measurement result when the immersion time is 240 minutes.

In the graph 72, a peak value of N1s is slightly larger than that of the graph 71. However, an overall tendency is the same as that of the graph 71, and is recognized as within an error category.

In the graph 73, a peak value of N1s is smaller than that of the graph 71. Other tendencies are the same as that of the graph 71.

The graph 74 has the same tendency as the graph 73, both of which substantially overlap each other. In addition, although not shown, measurement is also performed when the immersion time is set to 480 minutes, which is confirmed to have the same tendency as that of the graph 74.

As described above, it can be seen that the second layer 12 including the titanium oxide film is formed by immersion for 30 minutes or more in the solution immersion step of step S3. After the immersion for about 30 minutes, a large number of bubbles are generated. After 60 minutes, metallic luster of the titanium nitride film of the first layer 11 changes into a satin finished appearance. Thereafter, satin finish proceeds, and a dull satin finished appearance is obtained 240 minutes later.

Preferred Examples of Hardness

As described above, the second layer 12 has lower hardness than the first layer 11. In other words, the second layer 12 is a coating film softer than the underlying first layer 11.

Here, hardness of the base member 10, the first layer 11, and the second layer 12 in a preferred example will be described. The hardness uses the Vickers hardness (HV).

First, the hardness of titanium that forms the base member 10 is about 130 HV. When a titanium alloy is used, the hardness is about 310 HV.

Next, hardness of the titanium nitride film of the first layer 11 is about 2200 HV.

The hardness of the titanium oxide film of the second layer 12 is about 1000 HV.

Figures 5, 6:
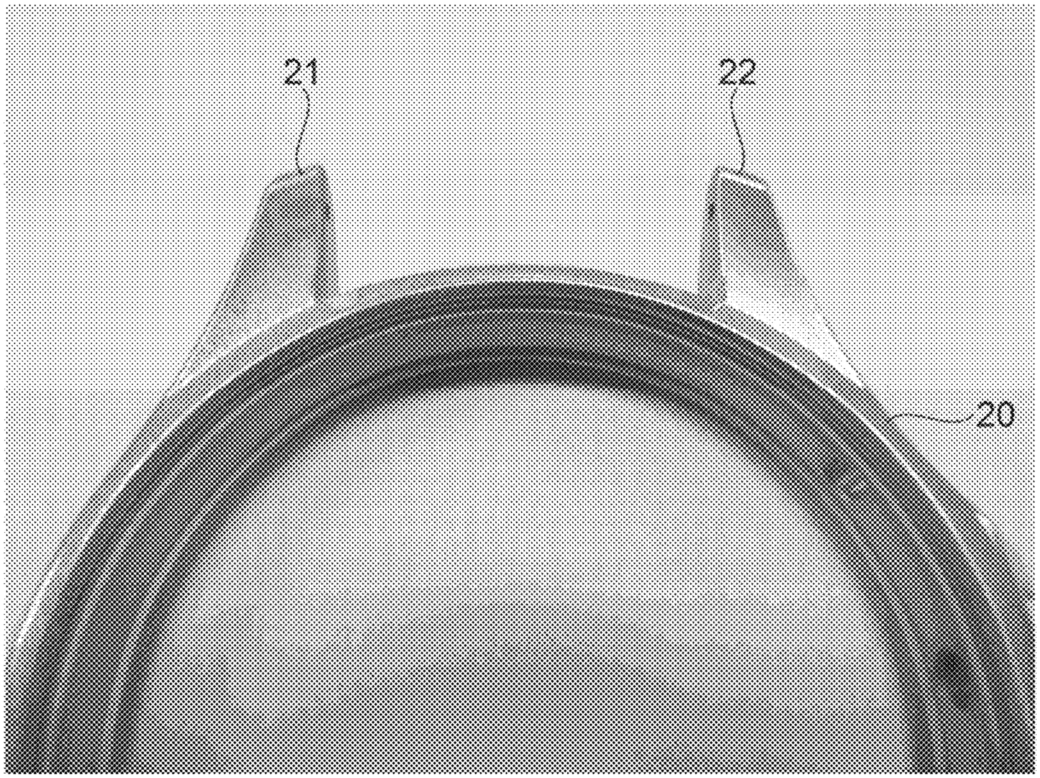
FIG. 5 is a photographic diagram showing a change in a surface of the timepiece body due to polishing.
FIG. 6 is a table showing combinations of a base member, a first layer, and the second layer that constitute the timepiece body.

FIG. 5 is a photograph showing a change in a surface of the timepiece body due to polishing. FIG. 5 is an enlarged photograph of lugs. The lugs are joining portions that join a band on an upper part of the timepiece body 20 of FIG. 1.

In FIG. 5, a lug 21 on a left side remains as the second layer 12 in an initial state, and has a satin finished appearance as described above.

In contrast, a lug 22 on a right side is in a state in which the underlying first layer 11 is exposed by polishing with an abrasive. With the exposed first layer 11, the lug 22 exhibits metallic luster.

Here, the abrasive uses a material containing alumina as abrasive particles. The alumina has hardness from 1400 HV to 1800 HV.

A relationship between the hardness of the abrasive and that of the first layer 11 and the second layer 12 is expressed by a formula (2) as follows.

Vickers hardness: First layer (TiN) >Abrasive>Second layer (TiO) Formula (2)

The hardness of the abrasive is assumed in daily use of the timepiece 100.

That is, when the hardness of the second layer 12 is from 1400 HV to 1800 HV, it is assumed that the second layer 12 is gradually scraped during daily use.

Modifications

FIG. 6 is a table showing combinations of the base member, the first layer, and the second layer that constitute the timepiece body.

As a preferred example as shown in combination No. 1 of FIG. 6, a case in which the base member 10 is made of titanium, the first layer 11 is a titanium nitride film, and the second layer 12 is a titanium oxide film is described above. The present disclosure is not limited to this configuration, and any combination may be used as long as the second layer 12 has lower hardness than the first layer 11.

For example, as in combination No. 2 of FIG. 6, the base member 10 may be made of titanium, the first layer 11 may be made of titanium carbonitride (TiCN), and the second layer 12 may be made of titanium oxide ($TiO_2$). In this case, in the step of forming the first layer 11 in step S2, methane ($CH_4$) gas is supplied in addition to nitrogen gas, and a titanium carbonitride film is deposited on the surface of the base member 10. Other steps are the same as those of the combination No. 1. Even with this configuration, the second layer 12 has a coating film configuration softer than the underlying first layer 11, and thus the same operation and effect as those of the combination No. 1 can be obtained.

The base member 10 is not limited to titanium, may be a hard material having a good texture, and may be metal or ceramics.

For example, as in combination No. 3 of FIG. 6, the base member 10 may be made of tantalum, the first layer 11 may be made of tantalum nitride (TaN), and the second layer 12 may be made of tantalum oxide ($Ta_2O_5$). Alternatively, as in combination No. 4 of FIG. 6, the base member 10 may be made of zirconia, the first layer 11 may be made of zirconium nitride (ZrN), and the second layer 12 may be made of zirconium oxide ($ZrO_2$). These manufacturing methods are the same as that of the combination No. 1. Even with these configurations, the second layer 12 has a coating film configuration softer than the underlying first layer 11, and thus the same operation and effect as those of the combination No. 1 can be obtained.

In this manner, regardless of the material of the base member 10, it is sufficient to have a configuration in which the first layer 11 is a nitride film or a carbonitride film, and the second layer 12 is an oxide film.

As described above, according to the timepiece body 20 and the timepiece 100 of the present embodiment, following effects can be obtained.

The timepiece body 20 as a timepiece component includes the base member 10, the first layer 11 provided at the base member 10, and the second layer 12 provided at the first layer 11. The second layer 12 has lower hardness than the first layer 11.

Accordingly, the second layer 12 having low hardness is partially scratched or peeled off during use, and thus it is possible to enjoy a change in appearance during use. In particular, when the underlying first layer 11 is partially exposed, it is possible to enjoy a better change in appearance.

Therefore, it is possible to provide the timepiece body 20 that changes into an appearance having an appropriate feeling of use or an antique appearance during use, and the timepiece 100 including the timepiece body 20.

The Vickers hardness of the second layer 12 is from 1400 HV to 1800 HV.

Accordingly, the second layer 12 is gradually scraped during daily use, and thus it is possible to enjoy a change in appearance during use.

In the X-ray photoelectron spectroscopy, the peak value of the N1s spectrum of the second layer 12 is equal to or less than the peak value of the N—O spectrum.

Accordingly, the second layer 12 having lower hardness than the first layer 11 can be reliably formed.

The first layer 11 is a nitride film or a carbonitride film, and the second layer 12 is an oxide film.

Accordingly, the second layer 12 as a surface layer can have a coating film configuration softer than the underlying first layer 11.

Second Embodiment

Different Aspect of Surface Treatment

FIG. 7 is a table showing combinations of the base member, the first layer, and the second layer that constitute the timepiece body according to the present embodiment. FIG. 7 corresponds to FIG. 6.

In the first embodiment, the second layer 12 is formed by oxidation using a solution. However, the present disclosure is not limited to this method, and any method may be used as long as the second layer 12 has lower hardness than the first layer 11. Hereinafter, the same components as those of the first embodiment will be denoted by the same reference numerals, and redundant description thereof will be omitted.

For example, as in combination No. 11 of FIG. 7, the base member 10 may be made of titanium, the first layer 11 may be made of titanium oxide ($TiO_2$), and the second layer 12 may be made of titanium. In this case, the titanium oxide of the first layer 11 is formed by the thermal CVD method or immersion in a hydrogen peroxide solution. The titanium of the second layer 12 is formed using a vapor deposition method. The vapor deposition method may be any of a physical vapor deposition method and a chemical vapor deposition method.

Alternatively, as in combination No. 12 of FIG. 7, the base member 10 may be made of titanium, the first layer 11 may be made of titanium nitride, and the second layer 12 may be made of titanium. Also in this case, the titanium of the second layer 12 is formed using the vapor deposition method.

Alternatively, as in combination No. 13 of FIG. 7, the base member 10 may be made of titanium, the first layer 11 may be made of titanium carbonitride, and the second layer 12 may be made of titanium. Also in this case, the titanium of the second layer 12 is formed using the vapor deposition method.

Alternatively, as in combination No. 14 of FIG. 7, the base member 10 may be made of zirconia, the first layer 11 may be made of zirconium oxide, and the second layer 12 may be made of zirconia. Also in this case, the zirconia of the second layer 12 is formed using the vapor deposition method.

Alternatively, as in combination No. 15 of FIG. 7, the base member 10 may be made of zirconia, the first layer 11 may be made of zirconium nitride, and the second layer 12 may be made of zirconia. Also in this case, the zirconia of the second layer 12 is formed using the vapor deposition method.

Alternatively, as in combination No. 16 of FIG. 7, the base member 10 may be made of tantalum, the first layer 11 may be made of tantalum oxide, and the second layer 12 may be made of tantalum. Also in this case, the tantalum of the second layer 12 is formed using the vapor deposition method.

Alternatively, as in combination No. 17 of FIG. 7, the base member 10 may be made of tantalum, the first layer 11 may be made of tantalum nitride, and the second layer 12 may be made of tantalum. Also in this case, the tantalum of the second layer 12 is formed using the vapor deposition method.

Even with these configurations, the second layer 12 has a coating film configuration softer than the underlying first layer 11, and thus the same operation and effect as that of the combination No. 1 can be obtained.

In addition to the above materials, tungsten, palladium, magnesium, aluminum, platinum, gold, silver, or copper may be used as the base member 10. In addition to the above materials, gold, silver, copper, magnesium, aluminum, or the like may be used as the second layer 12.

Refer back to FIG. 1.

In the above description, the timepiece body 20 was described as a timepiece component in a preferred example. Alternatively, the present disclosure is not limited thereto and may be applied to other exterior components of the timepiece 100. The above surface treatment may be applied to, for example, the back cover, the band, or the like as exterior components, and the same operation and effect as that of the timepiece body 20 can be obtained.

The crown 30, the button 31, and the button 32 are also timepiece components. Since these components are predetermined components related to functions, it may be not necessary to apply the above surface treatment. Specifically, in the predetermined components such as the crown 30, the button 31, and the button 32, a treatment may be retained and applied up to the first layer 11 without providing the second layer 12. Also in the timepiece body 20, without providing the second layer 12, masking processing may be applied to a portion having a function, such as a screw hole, a button hole, or a portion in contact with waterproof packing.

As described above, according to the present embodiment, the following effects can be obtained in addition to the effects of the first embodiment.

Even with the configurations of the combinations No. 11 to No. 17 of FIG. 7, the second layer 12 has a coating film configuration softer than the underlying first layer 11, and thus the same operation and effect as that of the combination No. 1 can be obtained.

In addition, the timepiece 100 has at least one of the timepiece body 20 and the back cover as a timepiece component. The timepiece 100 further includes a predetermined component including the crown 30. The predetermined component is not provided with the second layer 12. Accordingly, it is possible to maintain an initial appearance of the predetermined component related to a function.

What is claimed is:

1. A timepiece component comprising:

a base member;

a first layer provided at the base member; and a second layer provided at the first layer, wherein the second layer has lower hardness than the first layer, and the first layer is formed of either TaN or ZrN, wherein the second layer is an oxide film formed by removing nitrogen (N) from the first layer such that the second layer includes either TaO or ZrO, and includes N—O; and a peak value of an N1s spectrum of the second layer is equal to or less than a peak value of a N—O spectrum in X-ray photoelectron spectroscopy.

2. The timepiece component according to claim 1, wherein the Vickers hardness of the second layer is from 1400 HV to 1800 HV.

3. A timepiece comprising:

the timepiece component according to claim 1.

4. The timepiece according to claim 3, further comprising:

at least one of a timepiece body and a back cover as the timepiece component; and a predetermined component including a crown; wherein the predetermined component is not provided with the second layer.

* * * * *